US009360944B2

(12) United States Patent
Pinault

(10) Patent No.: US 9,360,944 B2
(45) Date of Patent: Jun. 7, 2016

(54) SYSTEM AND METHOD FOR ENHANCED GESTURE-BASED INTERACTION

(71) Applicant: Softkinetic Software, Brussels (BE)

(72) Inventor: Gilles Pinault, Anderlecht (BE)

(73) Assignee: Softkinetic Software, Brussels (BE)

( * ) Notice: Subject to any disclaimer, the term of this patent is extended or adjusted under 35 U.S.C. 154(b) by 0 days.

(21) Appl. No.: 14/370,590

(22) PCT Filed: Jan. 9, 2013

(86) PCT No.: PCT/EP2013/050318
§ 371 (c)(1),
(2) Date: Jul. 3, 2014

(87) PCT Pub. No.: WO2013/104681
PCT Pub. Date: Jul. 18, 2013

(65) Prior Publication Data
US 2014/0368428 A1  Dec. 18, 2014

(30) Foreign Application Priority Data

Jan. 9, 2012  (EP) .................................... 12000116

(51) Int. Cl.
*G09G 5/00* (2006.01)
*G06F 3/01* (2006.01)
(Continued)

(52) U.S. Cl.
CPC ................ *G06F 3/017* (2013.01); *A63F 13/06* (2013.01); *G06F 3/005* (2013.01); *G06F 3/014* (2013.01); *G06F 3/016* (2013.01); *G06F 3/0304* (2013.01); *G06F 3/0346* (2013.01); *A63F 2300/1012* (2013.01); *A63F 2300/1031* (2013.01); *A63F 2300/1037* (2013.01);
(Continued)

(58) Field of Classification Search
CPC ......... G06F 3/014; G06F 3/017; G06F 3/016; G06F 2203/0381
See application file for complete search history.

(56) References Cited

U.S. PATENT DOCUMENTS

2004/0012557 A1*  1/2004  Daniel ........................... 345/156
2004/0263358 A1*  12/2004  Madsen et al. .................. 341/20
(Continued)

OTHER PUBLICATIONS

Valentino Frati et al.; "Using Kinetic for hand tracking and rendering in wearable haptics"; publication; Jun. 21-24, 2011; 5 pages, pp. 317-321; IEEE World Haptics Conference Jun. 21-24, 2011, Istanbul, Turkey.
(Continued)

*Primary Examiner* — Lixi C Simpson
(74) *Attorney, Agent, or Firm* — Reinhart Boerner Van Deuren P.C.

(57) ABSTRACT

Described herein is a wireless remote control device (100) which can be used on the hand (150) of a user to provide both hardware-based control signals which can be associated with gesture-based control signals for enhanced gesture recognition systems. The device (100) comprises a housing (110) having a sensing unit having at least one control button (120, 130, 140) which is capable of generating a control signal for an associated computerized system. A computerized system utilizes information obtained from the control device (100) together with information obtained from a gesture recognition system to resolve any ambiguities due to, for example, occlusion of the hand performing the gesture or the hand being outside the field of view of an imaging system associated with the computerized system, and to trigger interactions within the gesture based interaction system.

27 Claims, 3 Drawing Sheets

(51) Int. Cl.
*A63F 13/20* (2014.01)
*G06F 3/03* (2006.01)
*G06F 3/0346* (2013.01)
*G06F 3/00* (2006.01)

(52) U.S. Cl.
CPC ... *A63F 2300/1043* (2013.01); *A63F 2300/1056* (2013.01); *A63F 2300/1081* (2013.01); *A63F 2300/1093* (2013.01); *G06F 2203/0381* (2013.01)

(56) References Cited

U.S. PATENT DOCUMENTS

| | | | |
|---|---|---|---|
| 2006/0248478 A1* | 11/2006 | Liau | 715/863 |
| 2007/0279380 A1* | 12/2007 | Murillo | 345/161 |
| 2008/0084385 A1 | 4/2008 | Ranta et al. | |
| 2010/0144436 A1* | 6/2010 | Marks et al. | 463/36 |
| 2010/0304868 A1 | 12/2010 | Zalewski | |
| 2011/0202306 A1 | 8/2011 | Eng et al. | |
| 2011/0269544 A1 | 11/2011 | Daniel | |
| 2011/0310002 A1 | 12/2011 | Tidemand et al. | |
| 2013/0069931 A1* | 3/2013 | Wilson et al. | 345/419 |
| 2013/0207890 A1* | 8/2013 | Young | 345/156 |

OTHER PUBLICATIONS

Brandon Shrewsbury et al.; "Providing Haptic Feedback Using the Kinect"; publication; Oct. 24-26, 2011; 2 pages, pp. 321-322; ASSETS'11, Oct. 24-26, 2011, Dundee, Scotland, UK.

* cited by examiner

SYSTEM AND METHOD FOR ENHANCED GESTURE-BASED INTERACTION

FIELD OF THE INVENTION

The present invention relates to a system and a method for human-to-machine interaction, and is, more particularly although not exclusively, concerned with wireless remote control devices for enhanced gesture-based interaction with an interactive computerised system.

BACKGROUND TO THE INVENTION

In the human-to-machine interaction domain, device controllers have been used for many years as interfaces between human users and hardware platforms. Through such interfaces, the user has been able to provide commands to a computerised system having means for receiving, processing, and executing actions in accordance with those commands. Device controllers may be wired or wireless and include mouse devices for computers, computer keyboards, TV remote controllers, game controllers, pads, virtual reality gloves . . . etc. All of these device controller systems share one common specification which is the use of known sensing devices, such as, for example, trigger buttons, multi-directional pads, inertial sensors units etc.

Furthermore, with the advance of technology in the virtual reality domain as well as in the consumer electronic domain, several systems have been developed that use such devices or a combination thereof. In particular, it has now become mandatory for the user to carry device controllers on him/her, wear or handle them in order to improve immersion into a virtual reality environment or in order to improve user experience for interactions with computerised systems.

For example, in US-A-2010/0304868, a multi-positional three-dimensional handled controller is described for interactivity with computerised systems. The controller provides control for a variety of applications and simulations, whilst providing an intuitive interface to interact with both two-dimensional and three-dimensional scenarios generated as a result of a computer program being executed through the computerised system of a game client. Such game clients can be a dedicated games console which can execute a locally stored program or can be connected to the internet so that a user can interact with another user at a different location. The controller is configured for use in multiple positions in order to provide flexibility in relation to the manipulation and handling of the controller. The controller comprises a handle having sensors that detect movement of input features relative to the handle, for example, a gyroscope, accelerometers, buttons, a joystick and a trackball. In one embodiment, the controller is hand-held and can operate in a "lollipop" mode where only the motion of the hand of a user provides wireless signals for interaction with an associated games console using a wireless protocol falling within the IEEE 802.11 specification. In another embodiment, the controller is again hand-held but operated in conjunction with a 2D camera that tracks the colour ball to detect gestures and which provides additional wireless signals to be processed by the games console. In a further embodiment, the controller can be operated with two hands. Ergonomics of the controller described in US-A-2010/0304868 require that the user actively and voluntarily holds the controller with a hand and does not allow free natural movements, including especially fingers movements, for gesture recognition within a gesture-based interaction system.

In US-A-2011/0269544, a hand-held computer input device is described for interacting with a games console. The device comprises a body on which are formed protrusions, the fingers and thumb of the hand of the user engaging with respective one of the protrusions. Each protrusion is configured to detect movement relative to one or more of the fingers of the user. Movement of the hand of the user as well as his/her thumb and fingers are sensed by the games console and tactile feedback can be provided to the user in response to commands transmitted to the games console. A pair of devices may be utilised but these are handled so that only one device fits the right hand and the other device fits the left hand. The hand-held interactive device described in US-A-2011/0269544 may be considered to be ergonomic from the point of view of fitting to the hand and fingers of a user, but it requires the user to grip the device for operation and does not allow free movement of the hands and/or fingers for gesture recognition within a natural gesture-based computerised system.

US-A-2008/084385 describes a computer pointing device which is worn on the hand and is operated without needing to contact a surface. Sensors located within the computer pointing device sense the movements of the hand of the user and converts those signals into signals for a host computer. The signals can be used to move a cursor or the like and provide right and left mouse clicks as well as scrolling operations. The device can be activated and deactivated so that only intended movements are transmitted to the host computer.

In the article entitled "*Providing Haptic Feedback Using the Kinect*" by Brandon Shrewsbury, Dundee, Scotland, UK, 26 Oct. 2011, a glove having a wearable vibrotactile feedback system is proposed which utilises buzzer motors to alert the user of objects within the field of view of the Kinect system. The buzzer motors are aligned with individual sections of the fingers with a bottom row on the palm of the hand.

US-A-2007/279380 describes a computer input device that can be attached to a hand. The device includes an adjustable band that can be wrapped around the palm portion of the hand. Control buttons and a joystick are provided which are operated by the thumb and fingers of the hand to which the band is attached. The device communicates with a computer either wirelessly or via an attached cable.

US-A-2011/202306 describes an immersive virtual reality system in which one or more body sensor units are employed for interaction with the system. The body sensor units include gloves and vests which include sensing elements for determining the position of the relevant part of the user on which the gloves or vests are worn. A display unit is provided for viewing of virtual representations of parts of the body of the user in correct spatial relationship to his/her own view point.

Frati et al. in their article entitled "*Using Kinect for hand tracking and rendering in wearable haptics*", World Haptics Conference (WHC), 2011, IEEE, IEEE, 21 Jun. 2011, pages 317 to 321, describe a wearable haptic device having motors for force feedback at finger pad contact points for position sensing within a field of view of a three-dimensional imaging system. A hand tracking algorithm is disclosed in which main hand points, such as fingertip positions, are extracted from a bounding box calculated from a depth map. However, the largest part of the hand must be visible for the hand tracking algorithm to work properly, in particular, several heuristics are used to define the identity of each of the fingers and these may fail if the whole or part of one or more fingers is occluded in the field of view of the three-dimensional imaging system.

More recently, gesture recognition technologies based on imaging sensing signal analysis have created interactive systems which allow the user to provide commands simply by using predetermined gestures to interact with the computerised system controlling and running such interactive systems. Such gesture recognition technologies do not make use of any devices worn by the user, and make use of either full body movement analysis, or hands only movement analysis.

However, when using either independent hardware-based controllers or natural gesture-based movements, there are limitations in the number of predefined interactions that can be performed. For a hardware remote controller device, it must, for example, be handled and it does not support finger tracking or reliable hand gesture recognition. Similarly, a full-body natural gesture recognition system does not allow a simple click action to be performed in the same way as a button activated by a finger on a remote controller would be as it requires a specific movement to be performed exclusively among some other movements. Moreover, when using gesture recognition systems, it is difficult to perform at the same time a simple click action and moving a hand around a control screen. One reason is that, a click action tends to be performed by either detecting a still pose of a hand for a predetermined duration at a specific location, or detecting a forward and backward movement along a predefined axis, for example, the Z or depth axis, within a predetermined period of time. It is therefore not possible to make use of one single hand to perform the two actions within the same time.

Furthermore, the combination of a natural gesture recognition system with an existing remote control device is limited as the existing apparatus has to be handled, introducing strong constraints in the kind and the number of gestures able to be performed and recognised.

SUMMARY OF THE INVENTION

It is an object of the present invention to provide a control device whose ergonomics is specific for use in combination with a gesture analysis system for interacting with a computerised system.

It is another object of the present invention to provide a control device that can be used within a natural gesture recognition system providing additional functionalities and/or extra information for the computerised system.

It is yet another object of the present invention to provide a control device that can be used for providing additional and refined information or data relating to the position and the movements or gestures of a user that can be tracked by an imaging system associated with the computerised system.

It is a further object of the present invention to provide a control device that can be used within a natural gesture recognition system providing additional functionality in the form of bi-directional exchange of information between the user and the computerised system.

It is yet a further object of the present invention to provide a method of controlling and using the control device in a computerised system to provide enhanced user experiences by allowing combination of natural gesture based and hardware device based interactions with a computerised system, and without limiting the individual features provided by either the device itself or the gesture recognition system.

The term "control means" as used herein is intended to include buttons, switches, directional pads and joysticks as well as any other suitable device through which a user can input a control signal. Such other suitable device, namely "extra control" may be, for example, and not exclusively a microphone for providing voice commands to the computerised system, an accelerometer, a gyroscope.

In accordance with a first aspect of the present invention, there is provided a method of controlling an interactive computerised system having a three-dimensional imaging system, the three-dimensional imaging system including a three-dimensional camera for providing three-dimensional information of at least one part of a user present within its frustum, the method comprising the steps of: a) providing a user-operated control device to be associated with at least one part of the user, the user-operated device comprising: a housing; a sensing module including at least one control means mounted in the housing, each control means being capable of generating a control signal for the computerised system when operated; at least one feedback module mounted in the housing for providing contextual feedback to the user in accordance with a signal generated by an application operating on the computerised system; a communication module located within the housing and through which each control signal is transmitted to, and each feedback signal is received from, the computerised system; and a controller module mounted in the housing, the controller module controlling the sensing module, the communication module and the feedback module in accordance with each generated control signal; b) generating control signals from at least one control means on the user-operated device; and c) using the generated control signals to control the interactive computerised system; characterised in that the method further comprises the step of using the information provided by the user-operated control device relating to the part of the user with which it is associated to resolve ambiguities in information measured by the three-dimensional imaging system.

The method may further comprise the step of: d) providing contextual feedback to the user in accordance with an application running on the computerised system. Additionally, the method comprises the step of: e) using the user-operated control device to provide information relating to at least the part of the user with which the control device is associated within the frustum of the three-dimensional camera.

Preferably, step e) comprises providing spatio-temporal related information relating to the part of the user with which the control device is associated. The spatio-temporal related information comprises at least one of: status, acceleration, orientation, and position of the part of the user with which the control device is associated.

In a preferred embodiment of the present invention, the information is used to extrapolate the position of the part of the user with which the user-operated control device is associated when it is no longer visible to the three-dimensional imaging camera due to one of: occlusion by another object; occlusion by part of the user; and it is outside the frustum of the three-dimensional camera.

In addition, the provided information relating the user part may be a position, velocity, acceleration and/or identification. The information can be provided by the device itself, or refined by combining data coming from the device with other data determined by a gesture analysis system. In a preferred embodiment, the provided information relating to the portion of the user may preferably be used to resolve ambiguities in information measured the three-dimensional imaging system.

In accordance with a further aspect of the present invention, there is provided a gesture-based interactive computerised system comprising a three-dimensional imaging system; a gesture recognition system; a user-operated control device comprising: a housing; a sensing module including at least one control means mounted in the housing, each control means being capable of generating a control signal for the computerised system when operated; a feedback module mounted in the housing for providing contextual feedback to the user in accordance with a signal generated by an application operating on the computerised system; a communication module located within the housing and through which each control signal is transmitted to, and each feedback signal is received from, the computerised system; and a controller module mounted in the housing, the controller module controlling the sensing module, the communication module and the feedback module in accordance with each generated control signal; and a computerised system associated with the three-dimensional imaging system and the gesture recognition system, the computerised system processing images captured by the three-dimensional imaging system and gestures recognised by the gesture recognition system; characterised in that the computerised system uses data from the user-operated control device in conjunction with the gestures recognised by the gesture recognition system to resolve ambiguities in information measured by the three-dimensional imaging system.

In particular, this gesture-based interactive system allows the input of control signals using gestures performed by the hand as well as hardware-based control signals generated by a user interacting with the control device. Moreover, the control device may be used to provide information relating to a predetermined action or event, particular data or parameters that cannot be generated by a natural gesture interaction in the context defined by the interactive computerised system. An example of this, is performing a click action while the hand is continuously scrolling a hand-controlled cursor on a display screen or performing a drag and drop operation as will be described in more detail below.

Preferably, the housing comprises an adjustable band having a first surface defining a palm side. Each control button is mounted on the palm side of the adjustable band and is operated by at least one finger of the user.

The adjustable band also has a second surface which defines a back side, the back side may have at least one control button to be operated by some other fingers of the user. It will be appreciated that this may be a finger from the other hand of the user.

In addition, another portion may be defined between the first surface and the second surface, the portion including at least one control means to be operated by a thumb of the user.

As the user-operated device comprises an adjustable band, it can easily be placed on and removed from the extremity, for example, the hand of the user. This means that in multi-player situations, each user can quickly pass the control device to the next user or from one hand to the other. This also means that the use of the control device is easy and intuitive and is not left- or right-handed specific.

At least a portion of the adjustable band comprises a flexible material. In one embodiment, the whole of the band may comprise flexible material. The flexible material may comprise an elastic material.

The provision of a flexible material enables the band to be easily fitted to the hand of a user, regardless of his/her hand size and gender, and is both comfortable and adjustable.

In one embodiment, the band is simply slipped on and off the hand permitting easy hand-over between users.

In one embodiment, the band is adjustable to fit different sizes of hand and may comprise a two-part adjustable fastening, each part of the two-part adjustable fastening being located at respective ends of the adjustable band. A preferred two-part adjustable fastening comprises a hook and loop fastener, but it will be appreciated that other two-part fastenings can also be used, for example, a magnetic- or mechanical-based closure systems.

The gesture-based interactive system of the present invention furthermore has the advantage that information can be provided to the computerised system while allowing free movement of the hand and fingers which can be used at the same time in an appropriate gesture recognition system. For example, the user-operated device is designed to enable gesture recognition systems to fit and track the skeleton of the hand of user hand skeleton.

In addition, by having at least one control means, the user-operated device provides additional features which are useful when interacting using gesture recognition with an object in a virtual environment, for example, the object can be grabbed by depressing a button on the device, moved to another location using a gesture, and released at that another location by releasing the button. Moreover, the operation of one or more control buttons does not interfere with the ability of the user to use natural gestures, at the same time, as required by a gesture recognition system.

In one embodiment, the feedback module of the adjustable band may also comprise at least one vibrator element. The vibrator element is located adjacent to a surface of the adjustable band which is closer to the user when worn. The vibrator element may be located on either the palm side of the adjustable band or on another part of the adjustable band, but preferably, at a location where it does not interfere with any of the other units that generate control information, such as, the accelerometer(s) or the gyroscope.

In addition, the feedback module may further comprise at least one of: a speaker module; a display screen; a light-emitting diode device; and a matrix touch feedback module.

BRIEF DESCRIPTION OF THE DRAWINGS

For a better understanding of the present invention, reference will now be made, by way of example only, to the accompanying drawings in which:—

DESCRIPTION OF THE INVENTION

Figure 1:
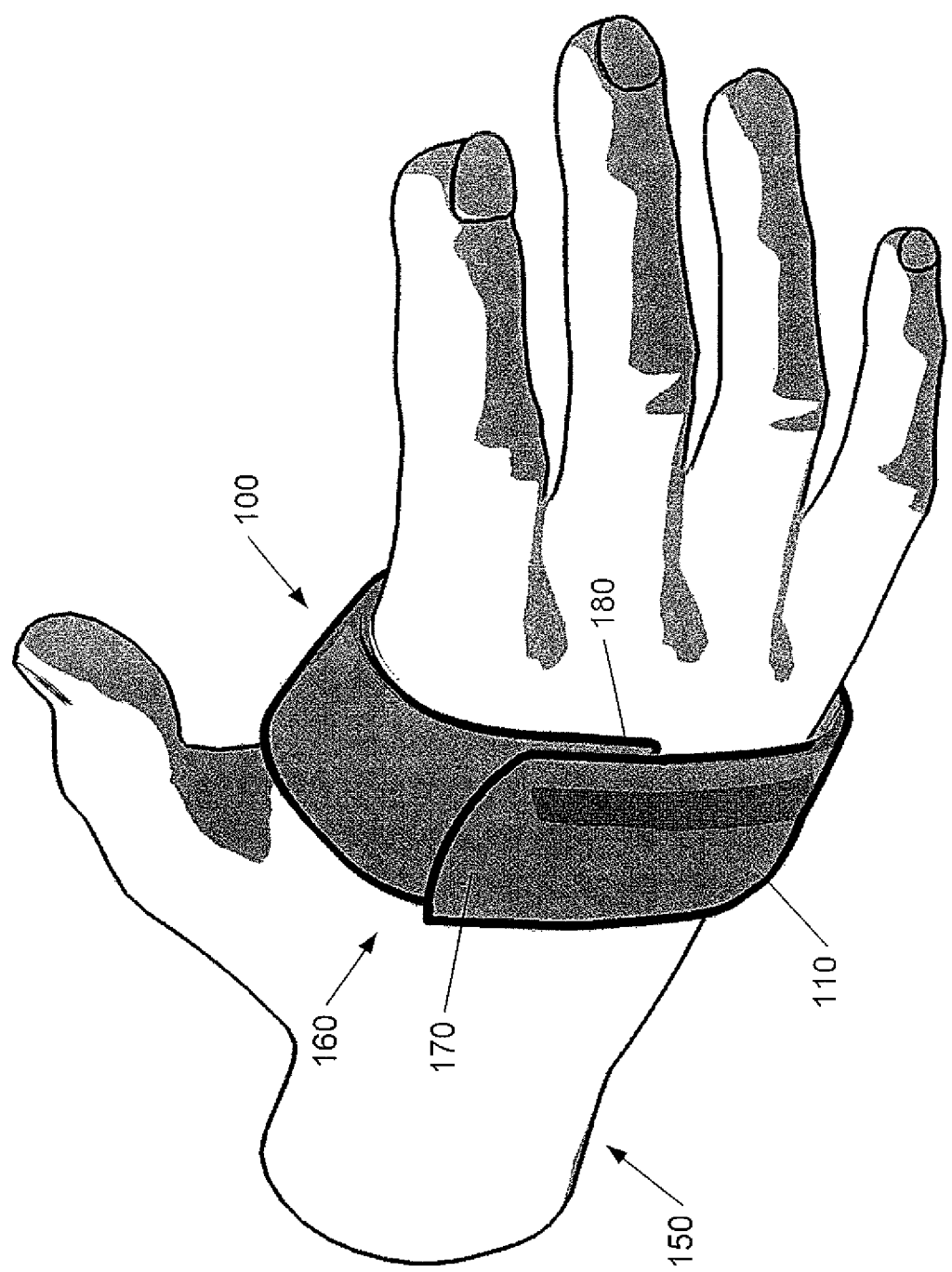
FIG. 1 illustrates a schematic perspective back view of a control device in accordance with one simple embodiment of the present invention.

The present invention will be described with respect to some particular embodiments and with reference to certain drawings, but the invention is not limited thereto. The drawings described are only schematic and are non-limiting. In the drawings, the size and exact position of some of the elements may be exaggerated and not drawn on scale for illustrative purposes.

The present invention relates to the human to machine interaction domain, and in particular, to a system and a method using a wireless control device designed for being used in combination with a natural gesture recognition system in order to enhance the user experience at interacting. In particular, the control device of the present invention provides additional features to the natural gesture recognition based computerized systems without limiting the features of the said gesture recognition system. It furthermore is able to provide feedback information to the user at interaction time so that to enhance the user experience in comparison to any computerised system using only one of either the gesture recognition or the hardware device control systems.

The controller devices described in US-A-2010/0304868 and US-A-2011/0269544 require the user to be active in holding the control devices in one or both hands in order to operate the controls and provide control signals for the computerised system which forms part of the associated games console. However, some users tend to struggle with a single size of device, for example, children whose hands are considerably smaller than those of adults. Naturally, a solution to this problem of different hand sizes would be to provide more than one size of device so that different sizes of hands can be accommodated with an increased cost for the user.

When designing marker-less gesture-based interactions for full body applications, it is often challenging to obtain data due to the lack of detailed information provided by a 3D camera, for example, the ability to track the most precise tool of a human body, the hand, or even more complex, the fingers. This is particularly a challenge when the user is at a substantial distance, typically, more than 3 m, from the 3D camera, and the computerised system is tracking parts of users within a room. One limitation when tracking a hand gesture or hand movements is it is difficult to determine if the hand is in an active state, for example, grabbing an item, or is in a passive state, for example, just passing over the object.

Another limitation when tracking a hand gesture or hand movements is the lack of feedback to the user in gesture-based recognition systems as they tend to be based on the display of information on a screen. In such systems, it is often difficult for the user of the system to estimate when a virtual representation of his/her hand is in contact with a virtual object. The use of visual feedback tends to clutter the display or screen and do not provide always a sufficiently natural and/or immersive feel for the user.

One further limitation in marker-less gesture recognition systems includes is the inability to recognise precisely enough hand orientations due to the lack of spatial resolution, ambiguity, occlusions, or either due to an object in the field of view of the 3D camera or to some potential self-occlusions, or moreover when the object being tracked is at a substantial distance (typically greater than 3 m) away from the 3D camera.

The present invention provides a remote control device that overcomes the above-mentioned limitations and which takes into account suitable functionality, ergonomics and ease of use of the device. The main features provided by the remote control device include:—
1. providing information relative to the hand status including at least two reliable states (and preferably more);
2. providing additional data to complement or refine those determined from a 3D camera based gesture recognition system;
3. providing additional feedback to the user for balancing the transparency and the usability of the system; and
4. providing ergonomic quality suited to complement marker-less full body natural gesture interactions with an application.

The device of the present invention comprises a band that can be worn over the hand and which incorporates at least one control button on the palm-side which can be operated by fingers of the same hand, the fingers of the user still being able to move freely in the same way they would without the presence of the control device. The device is used within a three-dimensional (3D) imaging system (including a 3D camera) forming part of a computerised system in a games console so that both gestures and direct control signals from the band can be processed by the system to enhance the user experience whilst interacting with a game running and being controlled by the computerised system.

Figure 2:
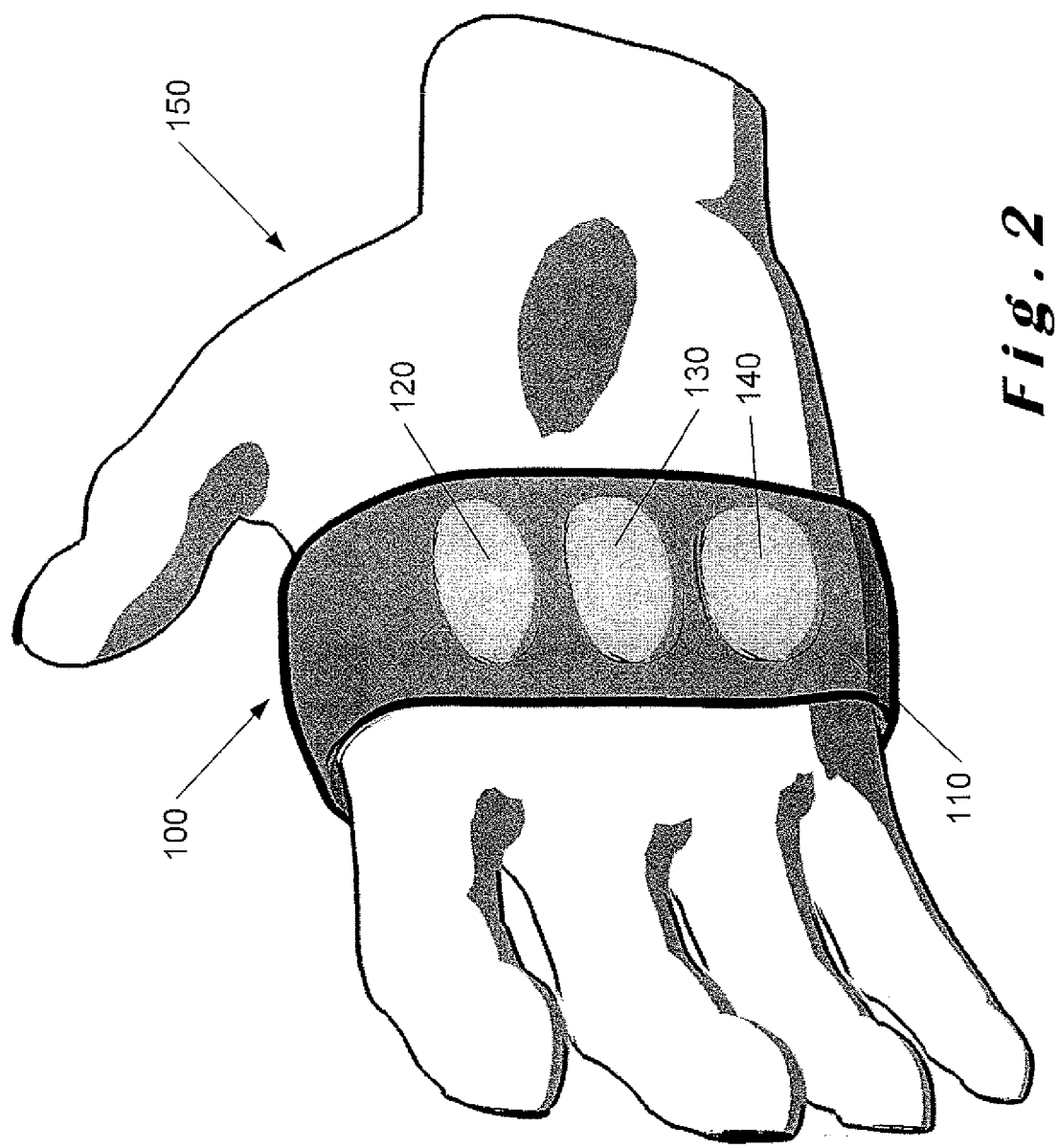
FIG. 2 illustrates a schematic perspective front view of the control device shown in FIG. 1.

In FIGS. 1 and 2, a controller device 100 in accordance with the present invention is shown. The device 100 comprises an adjustable band 110 on which is mounted three control buttons 120, 130, 140 as is shown more clearly in FIG. 2. As shown, the band 110 fits over a hand 150 of a user and is held in position on the hand by a fastening 160. The fastening 160 provides one position where the band 110 can be adjusted to fit the hand 150 of the user. Typically, the fastening 160 comprises a two-part fastening that can be adjusted to fit the hand, where one part of the fastening is fixed to one end 170 of the band and the other part of the fastening is fixed to the other end 180 of the band so that when the two ends 170, 180 overlap, the band 110 is secured around the hand 150. One such two-part fastener is a "hook and loop" fastener, for example, Velcro™ (trademark of The Velcro Company, Manchester, N.H., USA). However, it will be appreciated that other forms of two-part fasteners can also be used, for example, hooks and eyes; a magnet and a metal plate; press-studs etc.

The band 110 includes at least a two-axis accelerometer, preferably a three-axis accelerometer, and a gyroscope (not shown as it is embedded inside the band) for measuring orientation angles and the direction of gravity, as well as movement speed and acceleration in any direction. This has the advantage that the size of the device 100 may be considerably smaller than any hand-held control device. The accelerometer may then be able to provide the equivalent of two control axes of a standard joystick device merely by controlling pitch and/or roll inclination of the hand 150.

In addition, the accelerometer provides a reliable and precise value for the acceleration of the hand 150 when wearing the device 100. This reliable and precise value for the acceleration can be used to validate what a computerised system (not shown) presumes to be the hand. This presumption of the hand may be obtained by using an inverse kinematic-based user skeleton fitting process to identify parts of the user, and in particular, to identify the position of the hands over time. The spatio-temporal properties of the tracked hand may then be compared to the device data provided with respect to the position of the handling hand over the time in order to refine identification and accuracy of the data. In particular, the acceleration value provided by the device may be used to extrapolate the position of the hand when it is no longer visible to a 3D camera forming part of the computerised system due to occlusion by another object or part of the body, or because the hand is out of the field of view of the 3D camera.

Furthermore, accelerometer information that is passed to the computerised system may be combined with the identification and tracking of parts of the user to be able to load automatically functions and/or features for each control button according to the hand in which the control device is located. For example, in a two-device interactive application, the device in the right hand may be already configured for the particular application and the device in the left hand may also be configured in accordance with accelerometer information provided from the control device in the left hand of the user. When using two devices, the control means, that is, the buttons of each device may be configured according to the hand into which they are located. This is automatically performed when switching devices from the left hand to the right hand by comparing accelerometer and/or gyroscopic data from the device with spatio-temporal data for the left and right hands determined by the gesture recognition system.

A transceiver unit (also not shown) is also embedded inside the band 110 for transmitting control signals generated by the control buttons 120, 130, 140 to the associated computerised system. In addition, signals may also be received from the computerised system. Electromagnetic radiation in a suitable frequency band can used for transmitting signals between the controller device 100 and its associated computerised system.

As shown in FIG. 1, the fastening 160 is preferably located on the back of the hand 150 and as shown in FIG. 2, the control buttons 120, 130, 140 are locate in the palm of the hand 150. It will be appreciated, however, that it may not be necessary to have a fastening 160 if the band 110 is made of at least one suitable material that allows the band to be readily and easily placed onto and removed from the hand. In addition to the control buttons 120, 130, 140, a feedback element (not shown) may also be located on the palm-side of the device 100 that mitigates the lack of tactile sensation due to the contactless nature of the interaction with the 3D camera. The feedback element may comprises a vibrator that buzzes or vibrates as required, for example, to confirm that an object has been contacted with a virtual representation of the hand of a user in a virtual environment of a game running on the computerised system. Additionally, the feedback element may comprise an acoustic device that provides an audio feedback signal for the user. In addition, other forms of feedback can be implemented, either as alternatives or as additions. These may include thermal, electrical and/or contact arrangements.

In addition to having control buttons 120, 130, 140 located on the palm side of the band 110 as shown in FIG. 2, other control means or buttons (not shown) may be provided on the back side of the band for operation as for example by the other hand. Other control means or button may also be provided in between the back and the palm side of the device for operation, for example, with the thumb.

Each control button 120, 130, 140 may be an analogue button having a number of states which are controlled by the pressure of a finger of a user on the button. Alternatively, each control button 120, 130, 140 may comprise a binary state button which operates between an "on" state and an "off" state by depression by a finger of a user.

The control buttons 120, 130, 140 may also provide continuous signals representing pressure and/or distance as described below with reference to FIG. 3. In addition, biometric sensors may be implemented on the band, for example, to monitor heart rate and galvanic skin response.

As an alternative to discrete control buttons, a continuous sensing surface may be provided, for example, a control pad. Such a control pad (not shown) may be provided for operation by the thumb of the user, the control pad being located in a position on the band that can be accessed by the thumb when either the user is right- or left-handed.

In addition, the buttons may be pressure-, flex-, capacitive- and/or distance-sensors which provide continuous data instead of needing to be operated by a user to provide data.

In addition to the control means (that is, the buttons, accelerometers etc.), the device 100 also includes electronic parts, for example, a battery, a microcontroller, and a wireless module as will be described in more detail with reference to FIG. 3 below. All parts not directly used for the interface with the user are preferably located on the back of the band 110 so that they do not clutter the palm area which is used for providing the interaction with the computerised system.

In addition, input/output ports may be provided which permit the connection of additional sensors and/or actuators to the control device. For example, an add-on flex sensor may be provided to fit around the first or second finger which provides additional control data or an additional resistance to provide additional contextual feedback.

The band 110 may comprise silicone which is flexible and readily conforms to the shape of the hand 150. In addition, the band 110 may be shaped so that it can only be worn in one particular orientation so that the buttons, if predefined, can be used if the band is placed on the right hand or the left hand. More generally, the band 110 is preferably symmetrical about at least one plane so that the band can be worn on either the right or the left hand to provide ambidextrous use and/or to allow the user to have a band on each hand for more complex interactions. One advantage in using a type of silicone material for the band is that it provides grip with the hand of the user so that the control buttons can remain in the palm of the hand for easier operation.

Alternatively, the band 110 may be made of any other suitable material which can house the control means, the feedback means and any other necessary electronics for the operation of the device 100. The band 110 may comprise different materials utilised for their specific properties, for example, a portion of the band 110 to be located in the palm of the hand 150 may be of silicone to provide enhanced grip, a portion of the band 110 adjacent the silicone may be elastic so that the fit can be adjusted, and the fastener 160 may comprise Velcro so that the fit can be adjusted and for ease of locating the device 100 on the hand 150.

In use, a user places the device 100 over his/her hand 150 and adjusts it for a comfortable fit using the two-part fastener 160. Ideally, the fit of the device 100 on the hand 150 is a balance between the user holding the device and wearing it, that is, the user has to exert no effort in maintaining the device 100 in a position where the buttons 120, 130, 140 can easily be operated. Moreover, it will be appreciated that the device 100 is not a glove and does not need to be held for operation. Furthermore, the device can readily be applied to and removed from the hand.

Having the device in one hand, the user may interacts with a computerised system associated to gesture recognition means including a 3D imaging system, such as, a depth sensing 3D camera, and an application for providing contextual instructions and feedback information. In one embodiment, the user can be represented by an avatar on a screen in the centre of a virtual environment, and is free to act and move within the frustum of the 3D camera. Movement and gestures of the user are recognised by software operating in the computerised system. Feedback is provided to the user, for example, in the form of a vibration to indicate when the hand of the user has touched a virtual object in the virtual environment as displayed on a screen.

In its simplest embodiment, the band comprises a single button which, when depressed by a user, automatically sends a signal to the associated computerised system. In this particular case, it is possible to adjust the position of the button relative to the palm of the hand for operation by a preferred finger of the user, for example, one of the first or second fingers.

In another embodiment, two long buttons may be provided so that they can be operated by different or by the same fingers according to the preference of the user. Whilst the hardware set up of the device may be fixed, due to the ergonomics of the device, the two buttons may be located in positions where they can be operated naturally by the user moving one or two of the three most used fingers, namely, the first and second fingers and the thumb. For example, the first button, that is, the one that is nearest the first finger, may be used by the thumb and the other button may be used by the first or second finger.

In a more advanced embodiment where there is more than one button, it is possible to align the buttons for fingers of the user. Here, it will be appreciated that more than three buttons may be provided as described above with reference to FIGS. 1 and 2. In addition, there may be more than one row of buttons.

It will be appreciated that, apart from the simplest embodiment where the function of the button is predefined, the function of each button may not be fixed and may be user or computer system-definable. In a more preferred embodiment, the computer system may include means for pre-setting automatically and dynamically the control means, especially buttons, according to the application operated by the computerised system, or according to one particular context in the application being run by the computerised system.

In another embodiment, the accelerometer can be used to determine the vertical direction due to gravity and the functionality of each button is assigned accordingly.

In a preferred embodiment, the device may be used in a virtual environment in which a user can be represented by an avatar standing in the scene. The user can act and move freely within the frustum of the 3D camera associated with the computerised system so that his/her movement and/or gestures can be recognised and tracked by the software run in the computerised system, and then associated with the control device 100 inputs in accordance with the present invention. To make the avatar move and interact within the scene, the user uses the features provided by the control device 100 and also those provided by gesture recognition software.

Some features that can be implemented by the buttons 120, 130, 140 include:—

When a first button is depressed, the orientation of the device 100 is registered with the associated computerised system and from there changes in direction control the speed of translation, forwards or backwards, and the rotation speed to the left or right as if the device 100 was a joystick in the hand of the user. When the button is released, the navigational control provided by the device 100 is paused so that movements of the user are used to interact directly with the virtual environment.

When a second button is depressed, using a similar mechanism to the first button, the user can control the rotation of the 3D camera around the avatar in the virtual environment.

When a third button is depressed, a "drag and drop" function can be implemented. Here, the nearest "physical" object, that is, the nearest object in a virtual representation, to the hand of the user on which the device 100 is placed moves towards the virtual object and grabs it, the virtual object following the movements and direction of the hand as long the button is not released. When the button is released, the object is dropped at the location of the hand of the user, with respect to the virtual environment, at the time the button is released.

This particular function provides the ability to pick up, carry, move and launch virtual objects within the virtual environment.

When a collision occurs between an object in the scene and the avatar representation of the user, the vibrator on the palm of the device vibrates with an intensity which may be proportional to the intensity of the virtual shock or proportional to the hardness of the material with which the object is supposed to have collided. Similarly, increased vibration can be used to relay information to the user about the weight of a virtual object.

It will be appreciated that it is important that the hand on which the control device 100 is placed can be detected within the scene. This can be done using any skeletal representation of a user having a portion that corresponds to the hand. The location of the hand in virtual space can be improved using the output from the three-axis accelerometer and using additionally output of a gyroscope. Instead of using a skeletal representation, the movement of any identified feature of the scene by means of image processing, for example, extremities, coloured objects, specific shapes, body parts etc., all being within the frustum of the 3D camera, can be compared with the acceleration of the device 100 in order to evaluate the probability that the device is attached to that identified feature.

In another preferred embodiment, a gyroscope may be provided within the device 100 and provides information that improves orientation detection of the body part, and in particular the hand, to which the device is attached.

In another preferred embodiment, the gyroscope may be replaced by a compass in order to provide absolute orientations measurements instead of relatives orientations measurements. The use of these absolute measurements being also used for improving orientation detection of the body part, and in particular the hand, to which the device is attached. This may be in addition to the gyroscope.

In addition, multiple control devices can be used at the same time. For example, a single user may use a control device on each hand or multiple users may each use a control device on one hand. In these cases, the communication protocol used needs to be able to distinguish between the identity or individual address of each control device.

Figure 3:
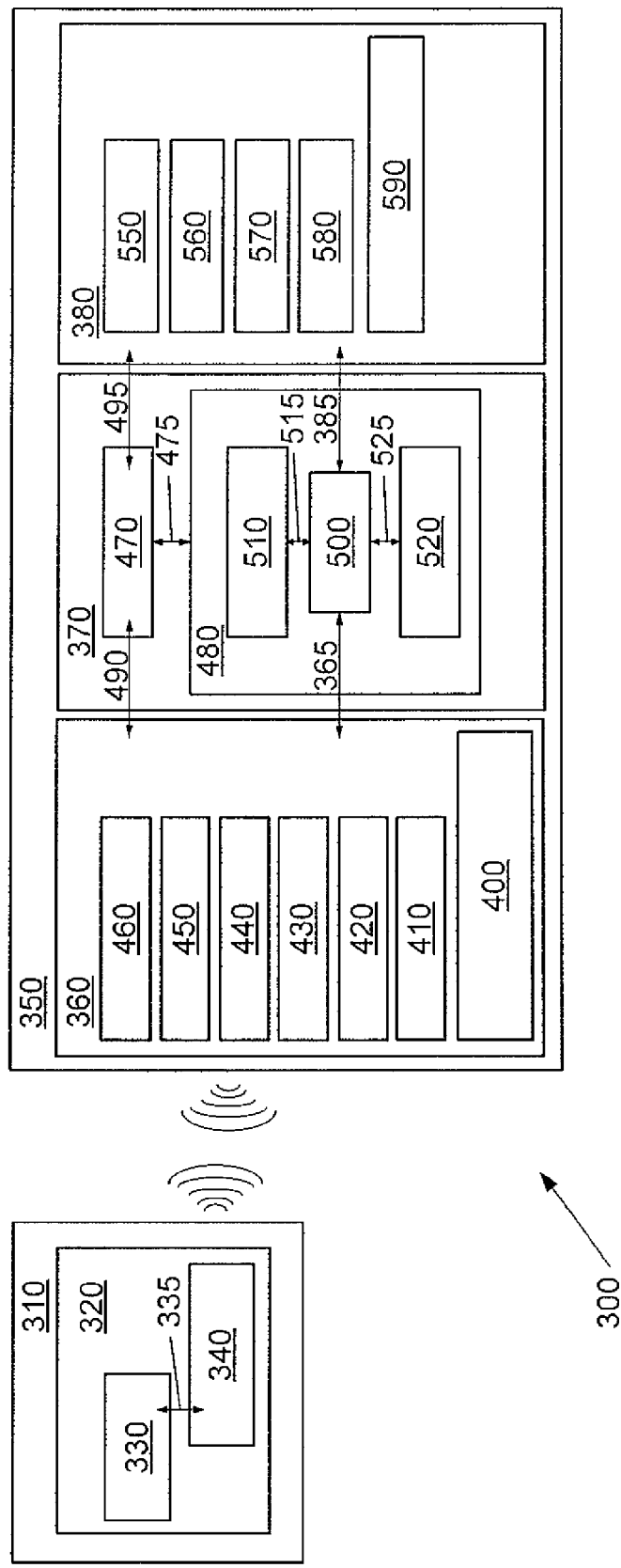
FIG. 3 illustrates a block diagram illustrating the components of the control device shown in FIGS. 1 and 2 and the controller with which it interacts.

Turning now to FIG. 3, a block diagram of a control system 300 for an interactive games console or computer system (not shown) is shown. The control system 300 comprises a computerised system 310 which is housed in the interactive games console and which comprises an electronics module 320. The electronics module 320 comprises a microcontroller 330 and a transceiver 340. The transceiver 340 operates on one or more of Bluetooth™ (trademark of the Bluetooth Special Interest Group), Wi-Fi™ (trademark of the Wi-Fi Alliance), ZigBee™ (trademark of the ZigBee Alliance), and other radio frequency (RF) bands. [Bluetooth operates in the Industrial, Scientific & Medical (ISM) band of 2.4 to 2.48 GHz; Wi-Fi operates in accordance with IEEE 802.11; and ZigBee also operates in accordance with IEEE 802.] Naturally, the transceiver 340 may operate using other communication systems, for example, using visible light and infrared radiation. It will be appreciated that the transceiver 340 may operate using more than one type of radiation and/or RF band. In this case, dedicated transmit and receive modules are provided for each type of radiation and/or RF band.

The transceiver 340 is connected to and controlled by the microcontroller 330 for two-way communication as indicated by arrow 335, and transmits and receives signals from a control device 350 in accordance with the present invention. The control device 350 corresponds to the device 100 described above with reference to FIGS. 1 and 2.

The control device 350 comprises three units groups, namely, the sensing unit 360, the driving unit 370, and the feedback unit 380. The sensing unit 360 comprises the control means, that is, an inertial sensing unit 400, a binary states pad 410, an analogue pad 420, a binary joystick 430, an analogue joystick 440, a binary states button 450 and an analogue button 460. Although only one of these elements is shown, it will be appreciated that there may be more than one which may be present in the control device 350 according to one particular configuration.

The inertial sensing unit 400 may include at least a two axis accelerometer. In a preferred embodiment, the inertial sensing unit may include a single three-axis accelerometer as described above or three individual accelerometers each of which is aligned with a respective one of the x-, y- and z-axes. Alternatively or additionally, the inertial sensing unit 400 may also comprise gyroscopic elements aligned with respective ones of the x-, y-, and z-axes.

The binary states pad 410 and the analogue pad 420 are essentially pressure-sensitive input devices having at least one sensitive direction in a plane, for example, a north, a south, an east and a west direction, with a central push or binary state. Such pads are known as directional pads, joy-pads or D-pads.

In the case of the binary states pad 410, the pad may comprise a continuous flat form button in which the data value provided is digital and proportional to the direction chosen by the user and it can also be a "on" or "off" state.

In the case of the analogue pad 420, the pad comprises a continuous multi-directional 2D flat form button in which the data value provided is analogue and again proportional to the direction chosen by the user, the data value being continuous in each direction depending on how away the finger of the user is from the central position in a particular direction.

In addition, the binary states pad 410 and the analogue pad 420 may be cross-faders or multi-directional pads in which intermediate states are provided.

The binary joystick 430 and the analogue joystick 440 operate in a similar way to pads described above but each comprises a surface having a protruding element, for example, a stick, which is perpendicular to the surface. As described above with reference to the binary states pad 410, the binary joystick 430 provides a data value which is digital and proportional to the direction set by the user. Similarly, the analogue joystick 440 provides a data value which is analogue and proportional to the distance from a central position in a particular direction as set by the user.

The binary states button 450 comprises at least one button which can be operated between an "on" state and an "off" state by a finger of the user. One or more of the buttons 120, 130, 140 described above with reference to FIG. 2 may be a binary states button.

The analogue button 460 comprises at least one button which can be operated through a number of different states by pressure applied by a finger of a user. As before, one or more of the buttons 110, 120, 130 described above with reference to FIG. 2 may be an analogue button.

Connected to the sensing unit 360 is the driving unit 370. The driving unit 370 includes a power supply 470 which is connected to an electronics module 480 as indicated by arrow 475. The power supply 470 provides power to components within the sensing unit 360, as indicated by arrow 490, and also to components within the feedback unit 380, as indicated by arrow 495, as will be described below. The power supply 470 may be a battery or other portable electrical supply which may be rechargeable, for example, using induction, by means of a direct connection to a suitable mains supply, or by means of a USB connection to computerised system or other suitable computer device. The battery may also be recharged by movement of the user or by connection to a photovoltaic cell. In one embodiment, the control device 350 may also include a photovoltaic cell (not shown) through which the battery is constantly charged provided the light levels are sufficiently high.

The electronics module 480 includes a microcontroller 500, a transceiver 510, and an input/output (I/O) module 520. The microcontroller 500 is connected to both the transceiver 510 and the I/O module 520 as indicated by respective arrows 515 and 525 as shown. These connections are two-way connections so that information can be passed from the transceiver 510 and the I/O module 520 to the microcontroller 500 and from the microcontroller 500 to the transceiver 510 and the I/O module 520 as required. The microcontroller 500 is also connected, as indicated by arrows 365, 385 to the sensing unit 360 and the feedback unit 380 via suitable interfaces (not shown) within the sensing and feedback units 360, 380. Each interface connects to a bus (also not shown) for transmitting signals to and from each of the components 400, 410, 420, 430, 440, 450, 460 within the sensing unit 360 and the components within the feedback unit 380 as will be described in more detail below.

The I/O module 520 may include a USB port for connecting the device 350 directly to the computerised system 310. It may also include a charging point for charging the power supply 470 if the power supply comprises a rechargeable battery unit. In addition, other sensors may be attached to the I/O module 520 to provide further information relating to the movement and/or position of the hand of the user.

The feedback unit 380 comprises one or more of: a speaker module 550, a vibrator module 560, a display screen module 570, a light-emitting diode (LED) module 580, and a matrix touch feedback module 590. It will be appreciated that the number of feedback components provided on the device 100 will depend on the types of feedback to be provided. As described above, the vibrator module 560 is a preferred component for providing tactile feedback to a user.

The speaker module 550 comprises at least one speaker element for providing audio feedback to a user. The display screen module 570 and the LED module 580 provide visual feedback for the user, the display screen module 570 having the ability to display more detailed information than the LED module 580. In one preferred embodiment, the LED may provide power supply status information, changing colour from green (fully charged) to yellow (50% charge, for example) to red (in need of recharging).

The matrix touch feedback module 590 comprises an array of actuators, for example, vibrating elements or electrodes, which provides feedback in the form of a tactile sensation. In the control device 100 described above with reference to FIGS. 1 and 2, this module is located in an area where it can be located against the skin of the user to stimulate tactile sensations.

Whilst the control device present invention has been described with reference to specific embodiments, it will be appreciated that other implementations of control device are also possible.

The invention claimed is:

1. A method of controlling a gesture-based interactive computerised system having a three-dimensional imaging system, a user-operated control device, a gesture recognition system, and a computerised system associated with the three-dimensional imaging system and the gesture recognition system, the user-operated control device being associated with at least one part of a user and being configured to allow free movement of hand and fingers at the same time in the gesture recognition system and comprising a housing; at least one sensing module including at least one control means mounted in the housing, each control means being capable of generating a control signal for the computerised system when operated; a feedback module mounted in the housing for providing contextual feedback to the user in accordance with an application operating on the computerised system; a communication module located within the housing and through which each control signal is transmitted to, and each feedback signal is received from, the computerised system; and a controller module mounted in the housing, the controller module controlling each sensing module, the communication module and the feedback module in accordance with each generated control signal, the three-dimensional imaging system including a three-dimensional camera having a frustum, the method comprising the steps of:

a) capturing images using the three-dimensional imaging system;

b) processing the captured images in the computerised system to recognise and track at least the three-dimensional information relating to the at least one part of the user;

c) recognising gestures performed by the at least one part of the user using the gesture recognition system;

d) generating control signals from the user-operated control device which include at least three-dimensional position information relating to the at least one part of the user with which the user-operated control device is associated; and e) using the three-dimensional position information provided by the user-operated control device to resolve ambiguities in the three-dimensional information relating to the at least one part of the user measured by the three-dimensional imaging system in order to control the gesture-based interactive computerised system.

2. A method according to claim 1, further comprising the step of: f) providing contextual feedback to the user in accordance with an application running on the gesture-based interactive computerised system.

3. A method according to claim 1, wherein step step d) comprises providing spatio-temporal related information relating to the part of the user with which the user-operated control device is associated.

4. A method according to claim 3, wherein the spatio-temporal related information comprises at least one of: status, acceleration, orientation, and position of the part of the user with which the control device is associated.

5. A method according to claim 1, wherein step e) comprises using the three-dimensional position information to extrapolate the position of the part of the user with which the user-operated control device is associated when the part of the user is no longer visible to the three-dimensional imaging camera due to one of: occlusion by another object; occlusion by part of the user; and the part of the user is outside the frustum of the three-dimensional camera.

6. A method according to claim 1, wherein the at least one part of the user comprises an extremity of the user and step b) comprises determining the three-dimensional position of the extremity of the user.

7. A method according to claim 6, wherein the extremity of the user comprises a hand.

8. A method according to claim 7, wherein step b) comprises using an inverse kinematic-based user skeleton fitting process to identify the position of the hand over time.

9. A method according to claim 8, further comprising the step of:
f) providing contextual feedback to the user in accordance with an application running on the gesture-based interactive computerised system.

10. A method according to claim 6, further comprising the step of:
f) providing contextual feedback to the user in accordance with an application running on the gesture-based interactive computerised system.

11. A method according to claim 7, further comprising the step of:
f) providing contextual feedback to the user in accordance with an application running on the gesture-based interactive computerised system.

12. A gesture-based interactive computerised system comprising:
a three-dimensional imaging system configured to capture images within its frustum, the captured images being processed to detect and track over time at least three-dimensional information relating to at least one part of a user;

a gesture recognition system configured to recognise gestures performed by the at least one part of the user;

a user-operated control device configured to allow free movement of hand and fingers at the same time in the gesture recognition system the user-operated control device comprising: a housing; at least one sensing module including at least one control means mounted in the housing, each control means being capable of generating a control signal for the computerised system when operated; a feedback module mounted in the housing for providing contextual feedback to the user in accordance with an application operating on the computerised system; a communication module located within the housing and through which each control signal is transmitted to, and each feedback signal is received from, the computerised system; and a controller module mounted in the housing, the controller controlling the sensing module, the communication module and the feedback module in accordance with each generated control signal; and a computerised system associated with the three-dimensional imaging system and the gesture recognition system, the computerised system configured to process images captured by the three-dimensional imaging system and gestures recognised by the gesture recognition system and configured to use data from the user-operated control device in conjunction with the gestures recognised by the gesture recognition system to resolve ambiguities in three-dimensional information relating to at least one part of a user measured by the three-dimensional imaging system in order to control the gesture-based interactive computerised system.

13. A gesture-based interactive computerised system according to claim 12, wherein the housing comprises an adjustable band having a first surface defining a palm side, each control button being mounted on the palm side and operated by at least one finger of the user.

14. A gesture-based interactive computerised system according to claim 13, wherein the adjustable band has a second surface which defines a back side, the back side having at least one control button to be operated by other fingers of the user.

15. A gesture-based interactive computerised system according to claim 14, wherein a portion is defined between the first surface and the second surface, the portion including at least one control button to be operated by a thumb of the user.

16. A gesture-based interactive computerised system according to claim 13, wherein at least a portion of the adjustable band comprises a flexible material.

17. A gesture-based interactive computerised system according to claim 16, wherein the flexible material comprises an elastic material.

18. A gesture-based interactive computerised system according to claim 13, wherein the adjustable band comprises a two-part adjustable fastening, each part of the two-part adjustable fastening being located at respective ends of the adjustable band.

19. A gesture-based interactive computerised system according to claim 18, wherein the two-part adjustable fastening comprises a hook and loop fastener.

20. A gesture-based interactive computerised system according to claim 18, wherein the two-part adjustable fastening comprises one of: a magnetic closure and a mechanical closure.

21. A gesture-based interactive computerised system according to claim 12, wherein the feedback module comprises a vibrator element (560).

22. A gesture-based interactive computerised system according to claim 21, wherein the vibrator element is located adjacent a surface of the adjustable band which is closer to the user when worn.

23. A gesture-based interactive computerised system according to claim 12, wherein the feedback module further comprises at least one of: a speaker module; a display screen; a light-emitting diode device; and a matrix touch feedback module.

24. A gesture-based interactive computerised system according to claim 12, wherein the sensing module further comprises at least one of: a microphone for providing voice commands to the computerised system; an inertial sensing unit, a binary states pad, an analogue pad, a binary joystick, an analogue joystick, a binary states button, an analogue button, an optical sensor and a compass.

25. A gesture-based interactive computerised system according to claim 12, wherein the user-operated control device is ergonomic and symmetrical about a plane and which allows both hand gesture and finger gesture interaction whilst being ambidextrous compliant.

26. A gesture-based interactive computerised system according to claim 25, wherein the user-operated control device allows free natural movements for both hand and finger-based gestures.

27. A non-transitory computer readable medium storing a program causing a computer to execute a method of controlling a gesture-based interactive computerised system having a three-dimensional imaging system, a user-operated control device, a gesture recognition system, and a computerised system associated with the three-dimensional imaging system and the gesture recognition system, the user-operated control device being associated with at least one part of a user and being configured to allow free movement of hand and fingers at the same time in the gesture recognition system and comprising a housing; at least one sensing module including at least one control means mounted in the housing, each control means being capable of generating a control signal for the computerised system when operated; a feedback module mounted in the housing for providing contextual feedback to the user in accordance with an application operating on the computerised system; a communication module located within the housing and through which each control signal is transmitted to, and each feedback signal is received from, the computerised system; and a controller module mounted in the housing, the controller module controlling each sensing module, the communication module and the feedback module in accordance with each generated control signal, the three-dimensional imaging system including a three-dimensional camera having a frustum, the method comprising the steps of:
 a) capturing images using the three-dimensional imaging system;
 b) processing the captured images in the computerised system to recognise and track at least the three-dimensional information relating to the at least one part of the user;
 c) recognising gestures performed by the at least one part of the user using the gesture recognition system;
 d) generating control signals from the user-operated control device which include at least three-dimensional position information relating to the at least one part of the user with which the user-operated control device is associated; and
 e) using the three-dimensional position information provided by the user-operated control device to resolve ambiguities in the three-dimensional information relating to the at least one part of the user measured by the three-dimensional imaging system in order to control the gesture-based interactive computerised system.

* * * * *